Feb. 1, 1955   F. C. EASTMAN   2,700,920
INSTRUMENT CONTROL MOUNT
Filed Nov. 10, 1944   5 Sheets-Sheet 2

Inventor
Fred C. Eastman
By his Attorney

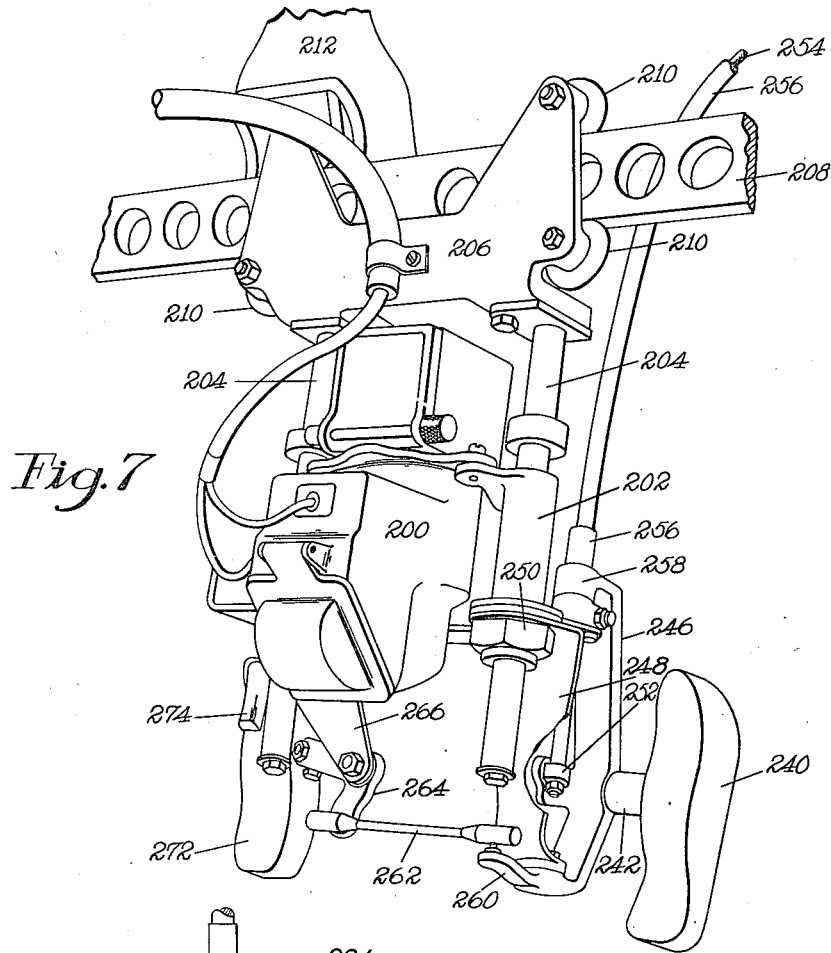
Fig. 7
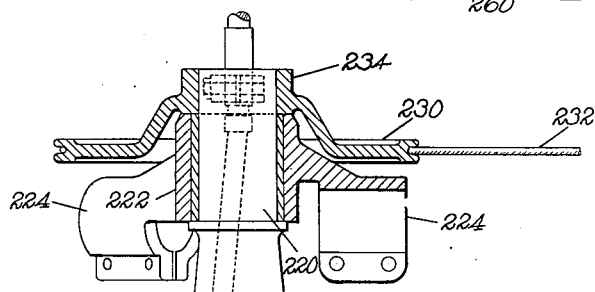
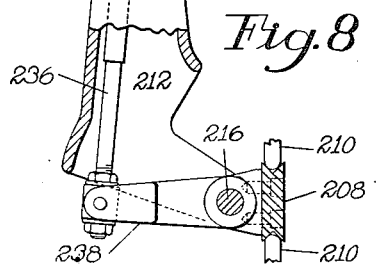
Fig. 8
Inventor
Fred G. Eastman
By his Attorney United States Patent Office 2,700,920
Patented Feb. 1, 1955

2,700,920
INSTRUMENT CONTROL MOUNT

Fred C. Eastman, Marblehead, Mass., assignor to United Shoe Machinery Corporation, Flemington, N. J., a corporation of New Jersey Application November 10, 1944, Serial No. 562,882

7 Claims. (Cl. 89—41)

This invention relates to a control means whereby an instrument such as a gun, camera or searchlight may be positioned in azimuth and/or elevation by power operation.

In the use of such instruments, the operator commonly finds his view through the sight cut off by structure surrounding the instrument or obscured by smoke which condition may well preclude him from using the instrument at all and which will certainly militate against efficient use of the instrument. Moreover, vibration set up by the instrument itself or by its support has often caused great difficulty for an operator to direct the effective line of action of the instrument. A 37 mm. gun mounted on a motor truck and firing 140 shots per minute has been known to cause the truck to jump three to six inches. It is well known that various conditions such as the vibration of motors, the firing of guns, and the rushing of air has caused military planes to vibrate greatly. The accurate directing or effective operating of an instrument mounted on such a plane is adversely influenced by the vibration.

The object of the invention is to provide an integrated mechanism including a control means handle and sight, which mechanism may be bodily movable as a unit in the vicinity of the instrument operatively connected thereto and where there is no, or the least, interference with the effective operation of the mechanism by such items as adjoining structure or smoke and in which position, actuation of the control means handle by the operator will bring about a corresponding power actuated movement of the instrument, which latter movement will correspondingly be transferred to the sight.

A more specific object is to provide a control means and sight both of which may be bodily movable as a unit in the vicinity of the instrument as desired by the operator.

A further object of the invention is to provide a control means and sight that are free of any definitely fixed support and that are connected to the instrument in such a way that vibration of the instrument or its support is not transmitted to the control means and sight.

With these purposes in view the apparatus of this invention is provided with control means and sight both being movable by the operator in the vicinity of the instrument and the control means having connections to power means for moving the instrument and said instrument having a system of linkages to the sight whereby movement of the instrument is transmitted back to the sight tending at all times to maintain a relation of parallelism between the line of sight and the effective line of action of the instrument. Preferably, and as shown in two illustrated embodiments of the invention as applied to a gun mount in an airplane, the control means comprises a pair of control grips having flexible cables for controlling the power actuated means to move the gun in azimuth and elevation. The grips are also provided with suitable triggers for electrically operating the gun firing solenoid. Associated with the control grips is a gun sight of any suitable type but herein shown in outline as a standard reflex sight having a casing and an aiming device utilizing a cross-hair image. In one preferred embodiment the gun is attached to the sight through a system of parallel linkages so that it is possible to translate the sight and grips (by means of the control grips) bodily and universally as a unit relative to the gun and still maintain the parallel relationship between the line of sight and the gun barrel. The arrangement of the linkages is such that a swing of the gun by the power means will cause a similar swing of the sight thus maintaining the parallel relationship and restoring the original relationship between the line of sight and the control grips.

Preferably, and as herein shown, the power means for actuating the movements of the gun comprise two hydraulically operated pistons, one piston being connected to move the gun in elevation through a crank and gear segment, and the other piston being connected to a yoke upon which the gun is mounted to rotate the yoke and gun together in azimuth.

It is preferred that the operator be relieved of the weight of the control means and sight as well as associated parts and therefore a counter-balancing device is provided in one modification of the invention to serve as a support.

The above and other objects and features of this invention will appear in the following detailed description of the illustrative embodiments thereof shown in the accompanying drawings, and will be pointed out in the claims.

In the drawings,

Fig. 7 is a perspective view of the mechanism illustrated in Fig. 6; and

Fig. 8 is a sectional view along the line VIII—VIII of Fig. 6.

Figure 1:
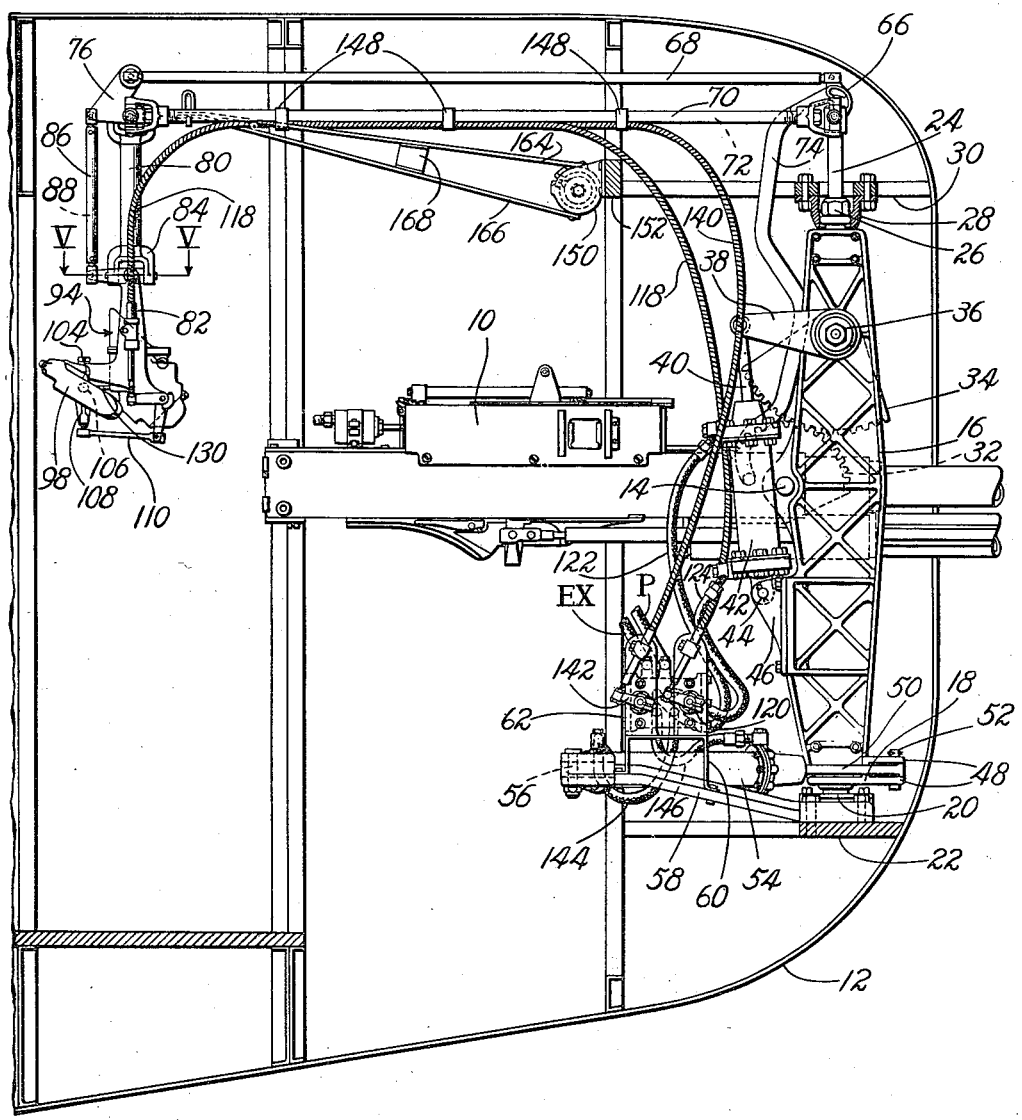
Fig. 1 is a sectional view of the tail end of an airplane embodying the present invention, showing the mounting of the power control for the operation of a gun.
Figure 2:
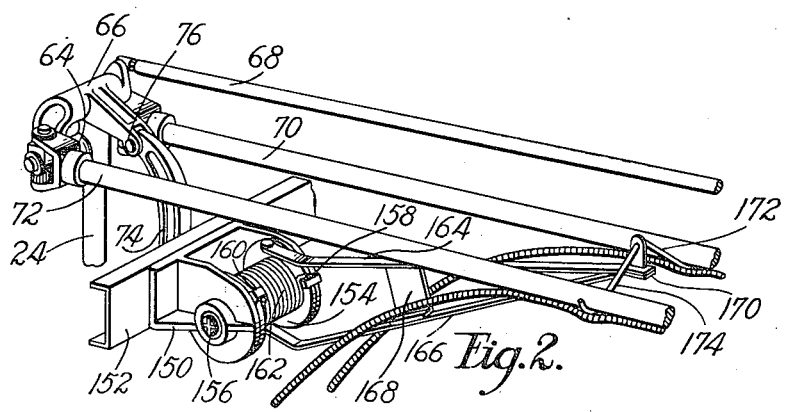
Fig. 2 is a perspective partial view of the linkages and one suitable means for supporting and counter-balancing the control grips and sight.
Figure 3:
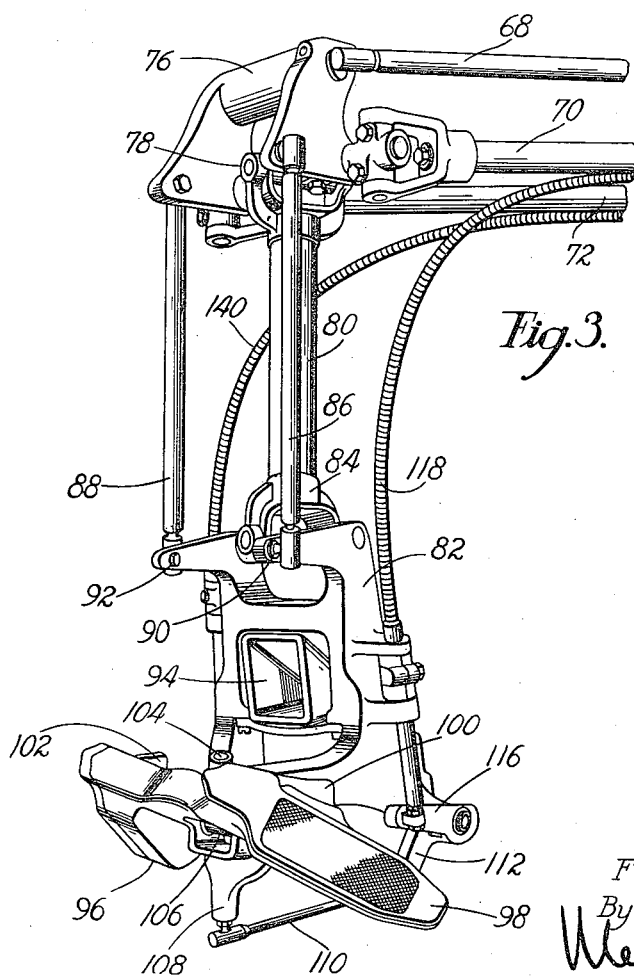
Fig. 3 is a perspective view of the control grips, sight, linkages and cables associated therewith.

In Fig. 1 a gun 10 is shown mounted within the tail 12 of an airplane. The gun is mounted upon trunnions 14 which are pivoted in suitable bearings on a yoke 16 for movement in elevation. The yoke 16 comprises two vertical side members only one of which can be seen in Fig. 1. The two side members of the yoke 16 are mounted upon a bottom plate structure 18 pivoted at 20 upon a structural member 22 of the airplane fuselage. The upper ends of the two side plates of yoke 16 are suitably joined together by a top plate (not shown) which has rigidly affixed thereto a rod 24 rotatably mounted in a bearing 26 supported by a bracket 28 from a structural member 30 of the airplane. The gun is provided with a gear segment 32 rigidly affixed thereto. A gear segment 34 is placed in mesh with gear segment 32 and is pivotally mounted upon the yoke 16 in bearings 36. The gear segment 34 is mounted upon and keyed to a shaft which rotates with the segment and to which shaft is affixed a lever 38 by means of which the segment may be actuated. Lever 38 has pivoted thereto a piston rod 40 which is operated by a piston in a hydraulic cylinder 42. The hydraulic cylinder 42 is pivoted at 44 on suitable lugs 46 fastened to the yoke 16. Lugs 48 extend from the bottom portion of the yoke 16 and a piston rod 50 is pivoted thereto at 52. The piston rod 50 is actuated by a piston in the hydraulic cylinder 54 which in turn is pivotally mounted at 56 to a stationary member 58 rigidly mounted on the airplane structural member 22. A suitable bracket 60 is fastened to the member 58 and supports a dual hydraulic valve 62. Such a dual hydraulic valve is not herein disclosed in detail since it is to be understood that any other type of hydraulic valve may be used if desired. However, a valve such as used with the apparatus herein claimed is fully shown and described in my copending application Serial No. 585,132, filed March 27, 1945, now Patent No. 2,602,671. The vertical rod 24 at the top of the yoke 16 is pivotally mounted (Fig. 2) at 64 to a bracket 66, said bracket 66 having rods 68, 70 and 72 universally pivoted thereto. A curved member 74 is also pivoted to the bracket 66 at 76 and said curved member 74 is pivoted at its lower end to the side of the gun as shown in Fig. 1. Rods or links 68, 70 and 72 are also universally pivoted to a bracket 76 (Figs. 1 and 3) and bracket 76 is connected by a universal joint 78 to a rod 80 from which a bracket 82 is suspended by a universal joint 84. Rods or links 86 and 88 are swivelly joined at 90 and 92 to the bracket 82. A standard reflex sight 94 is rigidly affixed to the bracket 82. A control means comprising the grips 96, 98 and triggers 100 and 102 are mounted on a vertical pivot 104 for rotation in a horizontal plane and relative to the bracket 82. The grips 96 and 98 are also rotatable about a shaft 106 suitably journaled upon the bracket 82 for rotation in a vertical plane. The grips 96 and 98 have a depending member 108 to which is fastened in pivoted relation a rod 110 having its other end pivoted to a lever 112 journaled at 114 (Fig. 5) to the bracket 82. The lever 112 has an arm 116 to which is affixed a flexible cable guided in a conduit 118. This cable is connected at its other end to an arm 120 (Fig. 1 and diagrammatically in Fig. 4) for controlling that portion of the dual valve 62 which in turn controls the elevation cylinder 42. Suitable hydraulic conduits 122 and 124 connect the ends of the hydraulic cylinder 42 to their appropriate ports in the valve 62. Rotation of the grips 96 and 98 in a horizontal plane about vertical pivot 104 causes the movement of the end 126 of pin 106 (Fig. 5) which is provided with a pivoted connection 128 to a rod 130 whose other end is pivotally connected at 132 (Fig. 5) to a lever 134 somewhat similar to the lever 112 but reversely constructed and having an upstanding arm for the connection at 132 instead of a depending arm as in the case of lever 112. Lever 134 is pivoted at 136 to the bracket 82 and an arm 138 of said lever 134 has connected thereto a flexible cable guided by the conduit 140. This flexible cable is connected at its other end to an arm 142 (Fig. 1 and diagrammatically in Fig. 4) which arm controls the other portion of the dual valve 62 for operating the hydraulic cylinder 54. The body of the dual hydraulic valve 62 has two upstanding brackets (Fig. 1) to which the valve ends of the conduits 118 and 140 are secured and supported. Suitable conduits 144 and 146 are connected from ports in the valve 62 to the opposite ends of the cylinder 54. To suitably mount the cable guiding flexible conduits 118 and 140, they are fastened to the links 70 and 72 by suitable clips 148 (see Fig. 1). In order to relieve the operator from the weight of the control means, sight, flexible cables and the linkages a counter-balancing device is used. Such a device is not essential but is advisable and in the present embodiment a bracket 150 is shown which is attached to a frame member 152 of the airplane. Said bracket 150 (Fig. 2) has a spool 154 pivoted thereto on a shaft 156. A lug 158 is attached to the bracket 150 at one end of the spool. At the other end of the spool 154 a lug 160 is attached. A spring 162 is wound and placed in tension about the spool in such a way that one end of the spring bears against the lug 158 and the other end of the spring bears against the lug 160. Two rigid straps 164, 166 joined together by a plate 168 are suitably attached to the spool for rotation therewith. The other ends of the straps 164, 166 are joined together at 170 and have depending therefrom hooks 172 and 174 which bear against the under sides of links 70 and 72. It can be seen that the weight of the hand grips, sight and associated elements is at least partially supported by the hooks 172 and 174 by means of the tension of the spring 162.

The relative parallel relationship between the gun and sight is maintained at all times because of the parallelogram linkages between them. If the operator were to grasp the control grips 96 and 98 and push them forward from the position shown in Fig. 1 the swinging of rods 80, 86 and 88 maintain that parallel relationship. Assuming that bracket 76 is not moved it can easily be seen that the sight can be moved forward and backward and that parallel rods 80, 86 and 88 insure that no tilting of the sight takes place because of such movement. If the sight 94 is moved upwardly, the rods or links 68, 70 and 72 (forming a parallelogram in so far as elevation is concerned) maintain the same parallel relationship of gun and sight. If the sight and control grips are moved sideways, the parallelograms (formed in one plane by the rods 70 and 72 and in the other plane by the rods 86 and 88) serve to maintain the relationship between the gun and sight.

Rotation of the hand grips 96 and 98 in a vertical plane causes the movement of the gun in elevation and such movement is brought about through movement of the rod 110, lever 112, arm 116, and the flexible cable in the conduit 118 which in turn operates the dual valve 62 to control the elevation cylinder 42.

Rotation of the grips 96 and 98 in a horizontal plane serves to move the gun in azimuth through the action of the pin 126, rod 130, lever 134, arm 138 and the flexible cable in the conduit 140 which operates the hydraulic valve to control the azimuth cylinder 54.

The electrical wiring for controlling the gun firing solenoid in the gun is not shown in the drawings but is necessarily flexible and easily attached to the linkages and connected to the triggers 100 and 102 for operation thereby.

Figure 4:
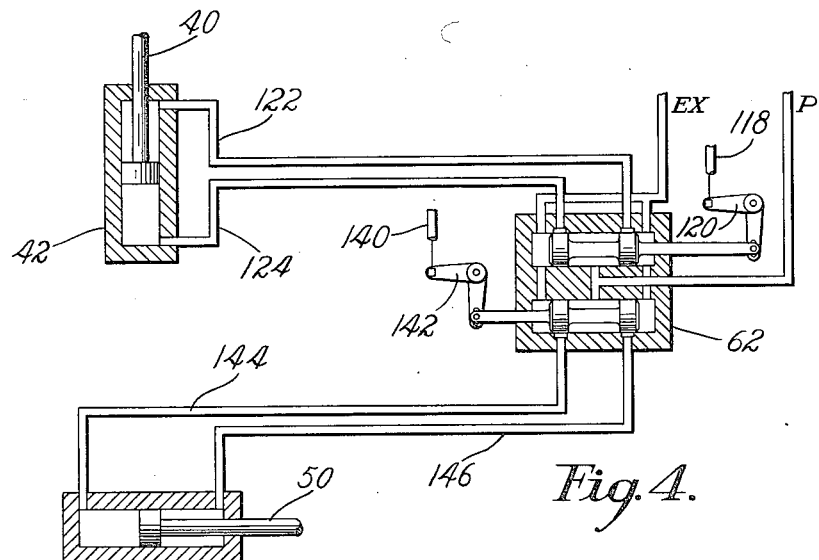
Fig. 4 is a diagrammatic view, in section, of the elevation and azimuth cylinders as well as the hydraulic valve connections therefor.
Figure 5:
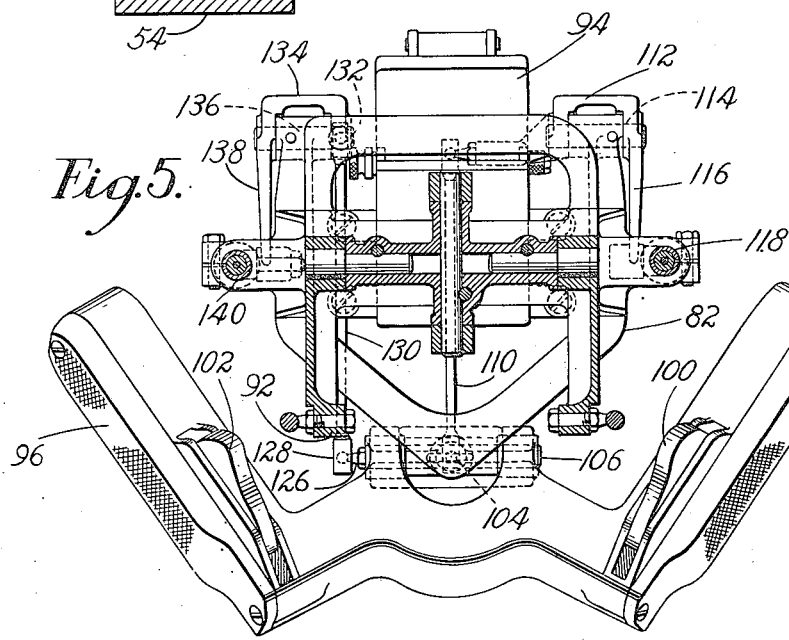
Fig. 5 is a sectional view along the line V—V of Fig. 1.

With the system of parallel linkages shown it is possible to translate the sight and control means mechanism as a unit relative to the gun and still maintain the parallel relationship between the sight and the gun barrel. The translation may be horizontal, vertical, oblique or universal. Rotation of the sight is entirely controlled by the gun. When the control grips are not only translated in position but are also rotated or shifted a given amount to bring about a ten degree rotation of the gun either in azimuth or in elevation, the sight rotates ten degrees also thus restoring the original parallel relationship between the line of sight and the control grips substantially instantaneously when the movement of control grips is stopped. The parallel relationship between the gun barrel and the line of sight is always maintained. The action of the parts may be set forth in another way, that is, movement of the control grips moves a cable with relation to its sheath or conduit to open a hydraulic valve and to start the power movement of the gun. When the movement of the control grips is stopped, the subsequent motion of the gun, sight and bracket 82 (the latter two elements are rigidly affixed to each other) then moves the proper cable back to its original position with relation to its sheath thus closing the hydraulic valve. Rotation of the control grips ten degrees will cause ten degrees' rotation of the gun and sight. To move the gun any further or to move it in another direction the operator must do it by moving the control grips. The theoretical operation of the hydraulic dual valve in the combination may be understood by referring to Figs. 1 and 4 particularly. The operator, having located his hand grips 96 and 98 to his liking and desiring to elevate the gun, will turn his grips in a counterclockwise direction (as viewed in Fig. 1) about the pin or pivot 106. As a result, the cable in conduit 118 will be pulled to the left as viewed in Fig. 1. This will actuate lever 120 to move the upper slide valve (in Fig. 4) to the left, permitting pressure fluid to enter the bottom of cylinder 42 by way of the line marked P and line 124 and permitting pressure fluid to escape from the top of cylinder 42 by way of line 122 and the exhaust line marked EX. The piston rod 40 is then forced upwardly with the result that the gun is elevated through the action of lever arm 38 and the gear segments 32 and 34. As the gun elevates, the position of the bracket 82 (and the sight 94) changes correspondingly because of the parallelogram linkages connecting it to the gun. As it changes, and assuming that the operator has ceased turning his grips, the cable which actuated the lever 120 is returned to its original position relative to its conduit or sheath 118. When this happens, the hydraulic valve has been brought back to its original position as shown in Fig. 4 and the gun elevates no farther. In the event that the operator wishes also to move the gun muzzle to his left, he will turn his grips 96 and 98 in a counterclockwise direction (as viewed in Fig. 5) about the pivot 104. Rod 130 will be pulled to actuate the left-hand cable relative to its conduit or sheath 140. This places the lower valve (Fig. 4) slightly to the left, permitting pressure fluid to enter the right-hand end of cylinder 54. Piston rod 50, through bracket 48, turns the yoke 16 and the gun muzzle swings to the left. Immediately after the counterclockwise movement of the grips is stopped the angular relationship between the control grips and the gun (or sight) is restored. This rotation or the reverse rotation of the hand grips for either elevation or azimuth is always accompanied by the "follow-up" action of the valves whereby the operator can hold the gun in any position desired.

With apparatus as above described the operator may grasp the control grips 96 and 98 and translate them together with the sight wherever he choses within the vicinity of the gun and in this way he may avoid intervention by smoke or any structural element with the line of sight. The sight and control grips are so intimately associated that the operator has close control over the gun, and the system of linkages which join the sight and control grips to the gun are such that the terrific vibration of the gun firing is dampened considerably before reaching the sight, enabling the operator more easily to secure and retain a steady sight on the target.

Figure 6:
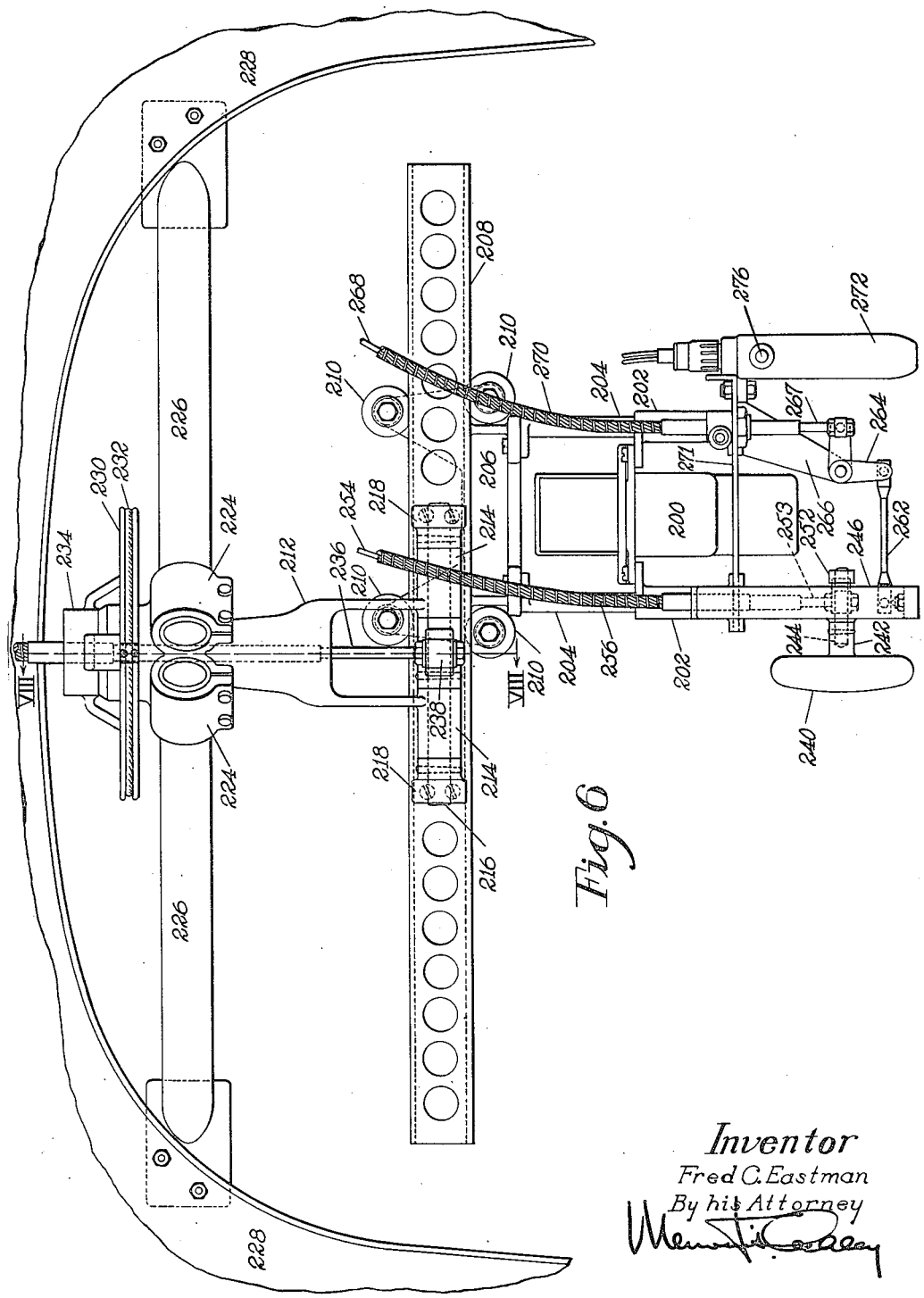
Fig. 6 is an elevation taken from the gunner's position illustrating an alternative mounting of the sight and of the power control for the operation of a gun.

In Figs. 6 to 8 there is illustrated an alternative mechanism for mounting a sight 200 and manual means for controlling the power operation of a gun. The arrangement is such that the sight and manual control means can be moved obliquely, up, down or horizontally by the operator in a manner approaching that used with the apparatus of Figs. 1 to 5 and with the same purpose in mind—to avoid possible obstructions to the line of sight. The sight is mounted on a carrier or elevator 202 mounted for sliding movement on parallel rods 204 secured to and projecting downwardly from a carriage 206 mounted to run on a horizontal rail 208, the carriage being provided with wheels 210 constructed and arranged to operate in the grooved edge faces of said rail (Fig. 8). The rail is supported by a bracket 212 on which it is mounted to turn on a horizontal axis. For mounting said rail the bracket 212 has cylindrical extensions 214 (Fig. 6) which are bored to receive a shaft 216 secured in ears 218 projecting from the rail. Referring to Fig. 8 the upper cylindrical portion 220 of the bracket 212 is rotatably mounted in a bracket 222 secured by integral split clamps 224 to bars 226 (Fig. 6) secured to and projecting diagonally from structural elements 228 of the airplane fuselage. For transmitting to the bracket 212 the movement of the gun in azimuth a pulley 230 is secured to an extension of the cylindrical portion 220 of the bracket and connected by a belt 232 to a corresponding pulley (not shown) secured to the shaft 24 (see shaft in Fig. 1) at the upper end of the yoke 16 on which the gun is mounted. It will be seen that the sight 200 and its mounting mechanism is held against downward movement by the engagement of the hub 234 of the pulley 230 with the bracket 222. For transmitting to the rail 208 movements of the gun in elevation a member 236 (Fig. 8) has one end anchored at a predetermined point on the gun carriage and the other end connected to an arm 238 projecting from the rail 208, the bracket 212 being made hollow to provide clearance for the operation of said link. This member 236 consists of a rigid end member pivotally fastened to arm 238 by means of nuts, as shown, and also to a flexible member guided within a swinging tube for transmitting end thrust as well as a pull and thereby move the rail 208 with the gun. The pulley 230 and the member 236 are the main elements which serve to maintain a definite angular relationship between the line of fire and the line of sight regardless of movement of the elevator 202.

For controlling the operation of the power mechanism which effects movements of the gun in azimuth and in elevation a hand lever or left-hand grip 240 is provided (Fig. 6). Referring to Fig. 6 said grip has a hub 242 in which is secured a short shaft 244 rotatably mounted in a yoke 246 (Fig. 7) pivotally mounted on a bracket 248 secured by a clamping nut 250 to the elevator 202. Secured to the shaft 244 is an angular arm 252 in which is anchored one end of the end element 253 of a flexible wire 254 slidably mounted in a conduit or tube 256 which is mounted in the upper hub 258 of the yoke 246. The remote end of the wire 254 (not shown) is connected to the mechanism which controls movement of the gun in elevation and both conduit 256 and wire 254 have sufficient slack to permit the desired range of movement of the carrier 202. For controlling movement of the gun in azimuth the lower part of the yoke 246 has an arm 260 projecting therefrom and connected by a link 262 to the vertical arm of a bell crank lever 264 pivotally mounted on a bracket 266 secured to the elevator 202. Secured to the horizontal arm of the bell crank lever is an end element 267 of a flexible link or wire 268 (Fig. 6) slidably mounted in a conduit 270 secured to a plate 271 connecting the opposite vertical slides comprising the elevator 202. The remote end (not shown) of the wire 268 is connected to the power mechanism for effecting movements of the gun in azimuth. Sufficient slack is used in conduit 270 and wire 268 for free movement of the carrier 202. It is to be understood that the ends of conduits 256 and 270 which are not shown are locked in position near the control devices operated by the sliding wires 254 and 268. A right-hand grip 272 is secured to an extension of the plate 271 and is rigid therewith. Mounted in said right-hand grip is a trigger 274 (Fig. 7) which operates a switch for causing the gun to be fired. There is also mounted in the right-hand grip a push button 276 (Fig. 6) which operates a switch controlling an electric signalling means. In addition to their functions above described the two hand grips 240 and 272 also provide a convenient means whereby the operator may move the elevator 202 vertically on the parallel rods 204 and also move the carriage 206 and the supported assembly on the rail 208. Thus the operator may readily translate the sight into the most suitable position for avoiding any obstruction to his line of sight, and during such translation the line of sight will at all times remain parallel to the line of fire of the gun.

Having thus described my invention, what I claim as new and desire to secure by Letters Patent of the United States is:

1. A mounting for an instrument including a yoke upon which the instrument is pivotally mounted for movement in elevation, said yoke being pivotally mounted for movement of the instrument in azimuth, power means for effecting such movements, an integrated mechanism including an instrument control means handle and a sight, said sight being in parallel relationship with the effective line of action of the instrument, said mechanism being bodily movable as a unit both vertically and horizontally in the vicinity of the instrument, means operatively connecting the control means handle with the power means during said bodily movement, and linkages connecting the instrument and yoke to the sight to maintain the said parallel relationship.

2. A mounting for an instrument including a yoke upon which the instrument is pivotally mounted for movement in elevation, said yoke being pivotally mounted for movement of the instrument in azimuth, power means for effecting such movements, a mechanism including an instrument control means handle and a sight, said sight being in parallel relationship with the effective line of action of the instrument, said mechanism being bodily and universally movable in the vicinity of the instrument, means for yieldingly supporting the weight of said mechanism, means for operatively connecting the control means handle with the power means during said movement of the mechanism, and linkages connecting the instrument and yoke to the sight to maintain the said parallel relationship.

3. A mounting for an instrument including a yoke upon which the instrument is pivotally mounted for movement in elevation, said yoke being pivotally mounted for movement of the instrument in azimuth, power means for effecting such movements, an integrated mechanism including an instrument control means handle and a sight, said control means handle being pivotally mounted for universal movement with respect to the sight, said sight being in parallel relationship with the effective line of action of the instrument, said integrated mechanism being bodily movable in the vicinity of the instrument, flexible means operatively connecting the control means handle with the power means despite bodily movement of said mechanism, and mechanical linkages connecting the instrument and yoke to the sight to maintain the said parallel relationship.

4. A mount for supporting an instrument, said mount including a yoke pivotally mounted for rotating the instrument in one plane, means adapted rotatively to mount the instrument in a second plane, power means for rotating the instrument in either plane, an integrated mechanism including an instrument control means handle and a sight, said mechanism being obliquely movable in the vicinity of the instrument, said control means handle being pivotally mounted with respect to the sight and having operative connections to the said power means during said oblique movement, said sight being in a parallel relationship with the effective line of action of the instrument, and linkages for maintaining the said parallel relationship when the said mechanism is manually translated obliquely by the control means handle.

5. A mount for supporting an instrument for movement in azimuth and elevation, power means for effecting such movement, an integrated mechanism including a control means handle and sight, said mechanism being free of any fixed support and being bodily movable relatively to the instrument while in operation and at the will of the operator into different convenient positions, said control means having operable connections to the said power means, and means for maintaining the sight in definite angular relationship with the instrument during the bodily movement to any of said positions.

6. A mounting for an instrument including a yoke upon which the instrument is pivotally mounted for movement in one plane, said yoke being pivotally mounted for movement of the instrument in another plane, power means for effecting such movements, an integrated mechanism obliquely movable as a unit including a sight and handle means for controlling the power means, said control means handle being pivotally mounted for universal movement on the said unit and with respect to the sight and having flexible connections to said power means, and linkages maintaining a parallel relationship of said sight with the effective line of action of said instrument during pivotal motion of the instrument and oblique motion as a unit of the said integrated mechanism.

7. A mounting for an instrument having an effective line of action, said mounting including a support upon which the instrument is pivotally mounted for movement to any angle within limits, power means for effecting such movements, an integrated control means including an operative handle and bodily movable as a unit in any direction during operation and having flexible connections to said power means whereby a pivotal motion of the said operative handle results in a corresponding pivotal motion of the instrument by power.

References Cited in the file of this patent

UNITED STATES PATENTS

| | | |
|---|---|---|
| 2,003,661 | Bassett et al. | June 4, 1935 |
| 2,034,223 | Brady | Mar. 17, 1936 |
| 2,054,224 | Levy | Sept. 15, 1936 |
| 2,320,238 | Horncastle | May 25, 1943 |
| 2,373,990 | Barnhart | Apr. 17, 1945 |
| 2,388,010 | Phol | Oct. 30, 1945 |
| 2,388,509 | Trotter | Nov. 6, 1945 |
| 2,409,041 | Hart et al. | Oct. 8, 1946 |
| 2,413,114 | Pontius et al. | Dec. 24, 1946 |

FOREIGN PATENTS

| | | |
|---|---|---|
| 422,009 | Great Britain | Jan. 3, 1935 |
| 436,071 | Great Britain | June 4, 1935 |
| 515,991 | Great Britain | Dec. 10, 1935 |
| 545,459 | Great Britain | Apr. 18, 1942 |
| 673,342 | France | Oct. 7, 1929 |
| 789,778 | France | Aug. 26, 1935 |

OTHER REFERENCES

"Aviation," April 1943, pages 229, 231.